(12) United States Patent
Caruso (10) Patent No.: US 10,282,433 B1
(45) Date of Patent: May 7, 2019

(54) MANAGEMENT OF DATABASE MIGRATION (71) Applicant: QUINTILES IMS INCORPORATED, Danbury, CT (US)

(72) Inventor: Brian Caruso, Seattle, WA (US)

(73) Assignee: Quintiles IMS Incorporated, Danbury, CT (US)

(*) Notice: Subject to any disclaimer, the term of this patent is extended or adjusted under 35 U.S.C. 154(b) by 571 days.

(21) Appl. No.: 14/943,702

(22) Filed: Nov. 17, 2015

(51) Int. Cl.
G06F 17/30 (2006.01)
G06F 3/06 (2006.01)
G06F 15/16 (2006.01)

(52) U.S. Cl.
CPC .......... *G06F 17/303* (2013.01); *G06F 3/0652* (2013.01); *G06F 17/30569* (2013.01); *G06F 17/30589* (2013.01)

(58) Field of Classification Search
CPC ................... G06F 17/303; G06F 17/30569
USPC .................................. 707/635, 600
See application file for complete search history.

(56) References Cited

U.S. PATENT DOCUMENTS

| | | | | |
|---|---|---|---|---|
| 7,299,237 | B1* | 11/2007 | Clark | G06F 17/303 707/999.202 |
| 2004/0010521 | A1* | 1/2004 | Li | G06F 17/30569 707/999.2 |
| 2006/0184561 | A1* | 8/2006 | Terada | G06F 17/303 707/999.102 |
| 2009/0222691 | A1* | 9/2009 | Riemers | G06F 17/303 707/999.101 |
| 2016/0210342 | A1* | 7/2016 | Vallabhaneni | G06F 17/30575 |
| 2017/0061027 | A1* | 3/2017 | Chesla | G06F 17/303 |
| 2017/0161346 | A1* | 6/2017 | Bryan | G06F 17/303 |
| 2018/0081962 | A1* | 3/2018 | Obitko | G06F 17/303 |
| 2018/0089185 | A1* | 3/2018 | Romano | G06F 17/303 |

* cited by examiner

*Primary Examiner* — Usmaan Saeed
*Assistant Examiner* — Brian E. Weinrich
(74) *Attorney, Agent, or Firm* — Fish & Richardson P.C.

(57) ABSTRACT

Methods, systems, and apparatus, are described, including computer programs encoded on a computer storage medium, for managing migration of data. The methods, systems, and apparatus may include actions of enabling a server to operate in different states. Generally, the different states of the server may enable code on client devices to be gradually updated from using data stored in an old database to using data stored in a new database in a different format, while enabling the server to continue responding to requests for data from client devices.

20 Claims, 3 Drawing Sheets

MANAGEMENT OF DATABASE MIGRATION

FIELD

This disclosure generally relates to database management.

BACKGROUND

Client devices may use a web service that provides access to data. For example, the client devices may use a web service to store and retrieve data stored in a database.

SUMMARY

A server may manage a database for client devices. For example, client devices may provide requests to the server for data stored in a database, and in response, the server may access the database to obtain data responsive to the request and provide the obtained data to the client device.

When new functionality is desired for client devices, the data stored in the database may be required to be migrated to a new format to enable the functionality. For example, in an initial format for a database, each record for a patient may only store a single value for a primary care doctor and to enable functionality to store up to five values for primary care doctors may require migrating the data in the database to a second format where each record for a patient may store up to five values for primary care doctors.

In a web services environment, migrating data from a database with an initial format to a database with a subsequent format may involve bringing a web service offline, and then simultaneously storing the data in a database with the subsequent format and updating code on the client devices to provide requests for data stored in the database with the subsequent format instead of requests for data stored in the database with the initial format. However, this approach may have negatives in that the web service is offline during the migration processes.

Accordingly, an aspect of the subject matter described in this specification may involve a process for managing migration of data. The process may include enabling a server to operate in different states. Generally, the different states of the server may enable code on client devices to be gradually updated from using data stored in an old database to use data stored in a new database with a different format, while enabling the server to continue responding to requests for data from client devices.

In one aspect, some implementations provide a computer-implemented method that includes receiving, by a server and from a client device, a request to migrate data from a first data store in a first structure format to a different, second data store in a different, second data structure format, in response to receiving, by the server and from the client device, the request to migrate the data from the first data store to the different, second data store, accessing the data in the first data store and storing the data in the second data store, determining, by the server, that the server has completed storing the data in the second data store from the data in the first data store, wherein when the server has completed storing the data in the second data store the server is in a first state where the server (i) exposes data from the first data store to the client device, (ii) does not expose data from the second data store to the client device, and (iii) replicates changes in the first data store to the second data store, in response to determining, by the server, that the server has completed storing the data in the second data store from the data in the first data store, providing, by the server, instructions to the client device to provide on a display of the client device, a graphical user interface that enables a user to request to place the server in the first state, a second state, or a third state, receiving, by the server and through the graphical user interface, a request to place the server in the second state, where in the second state the server (i) exposes data from the first data store to the client device, (ii) exposes data from the second data store to the client device, and (iii) replicates changes in either the first data store or second data store to the other data store, in response to receiving, by the server and through the graphical user interface, the request to place the server in the second state, placing, by the server, the server in the second state, receiving, by the server and through the graphical user interface, a request to place the server in the third state, where in the third state the server (i) does not expose data from the first data store to the client device, (ii) exposes data from the second data store to the client device, and (iii) replicates changes in the second data store to the first data store, and in response to receiving, by the server and through the graphical user interface, the request to place the server in the third state, placing the server in the third state.

Other versions include corresponding systems, apparatus, and computer programs, configured to perform the actions of the methods, encoded on computer storage devices.

These and other versions may each optionally include one or more of the following features. For instance, in some implementations the method includes receiving a request for data from the second data store, determining that the server is in the first state, and in response to determining that the server is in the first state, providing an indication that data from the second data store is not available. In certain aspects, the method includes receiving a request for data from the first data store, determining that the server is in the third state, and in response to determining that the server is in the third state, providing an indication that data from the first data store is not available.

In some aspects, in the second state, the server intercepts requests to change data stored in the first data store and generates a corresponding request to change data stored in the second data store. In some implementations, in the second state the server intercepts requests to change data stored in the second data store and generates a corresponding request to change data stored in the first data store. In certain aspects, the first structure format includes fields with single values and the second structure format includes corresponding fields with multiple values. In some aspects, storing the data in the second data store includes storing the data according to one or more migration rules that specify the fields in the first structure format that correspond to the fields in the second structure format. In some implementations, placing the server in the third state includes deleting the first data store.

The details of one or more aspects of the subject matter described in this specification are set forth in the accompanying drawings and the description below. Other features, aspects, and advantages of the subject matter will become apparent from the description, the drawings, and the claims.

DETAILED DESCRIPTION

Figure 1A:
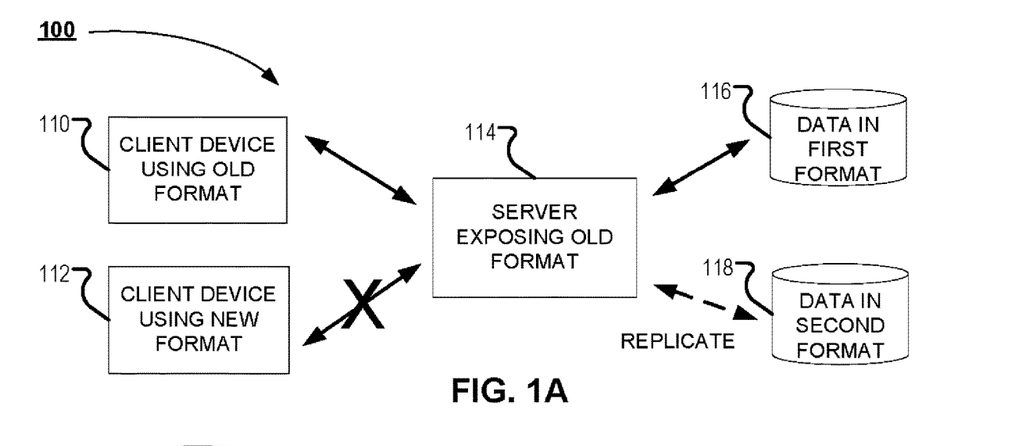
FIGS. 1A-1C illustrate an example system that manages migration of data with a server in different states.
Figure 1B:
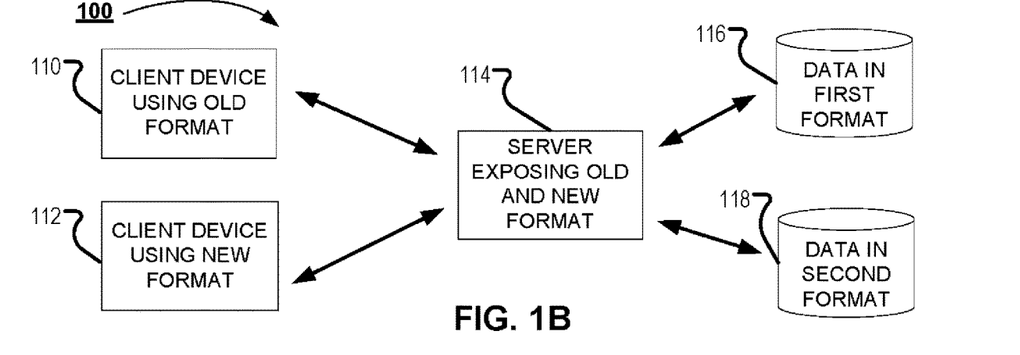
Figure 1C:
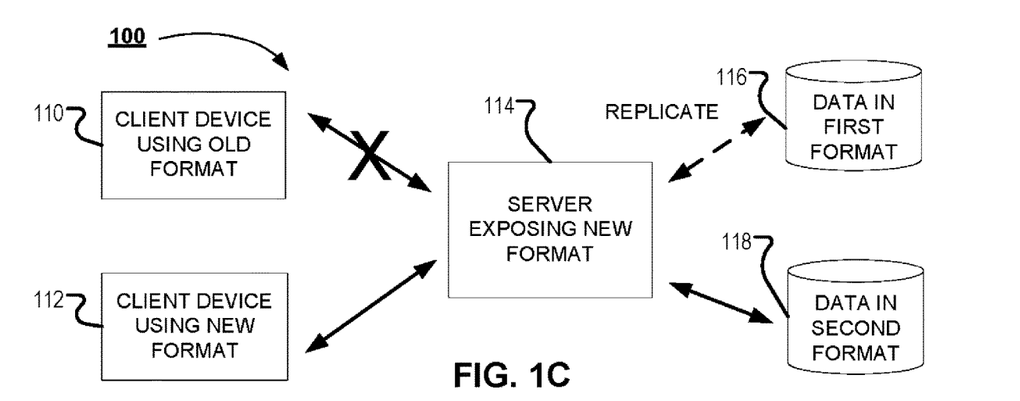

FIGS. 1A-1C illustrate an example system 100 that manages migration of data with a server 114 in different states. The system 100 may include a first client device 110 with code to access data using an old format, a second client device 112 with code to access data using a new format, a first database 116 with data stored in a first structure format, and a second database 118 with data stored in a second structure format. The client devices 110, 112 may be computing devices that are remote from the server 114 and in communication with the server 114 over a network. The first client device 110 may include code that requests that the server 114 provide data from the first database 116. For example, the first client device 110 may include code to retrieve a record for a patient with the name "JOHN DOE" from a database labeled "FIRST_DATABASE," e.g., "SELECT ROW WHERE NAME='JOHN DOE' FROM FIRST_DATABASE." The second client device 110 may include code that requests that the server 114 provide data from the second database 118. For example, the second client device 112 may include code to retrieve a record for a patient with the name "JOHN DOE" from a database labeled "SECOND_DATABASE," e.g., "SELECT ROW WHERE NAME='JOHN DOE' FROM SECOND_DATABASE."

The databases 116, 118 may be data stores that store data in different structure formats. For example, the first database 116 may store patient records where each patient can only be associated with a single primary care provider and the second database 118 may provide additional functionality by storing patient records where each patient can be associated with up to five primary care providers.

The server 114 may be one or more computing devices that manage the databases 116, 118. For example, the server 114 may receive requests for data from the databases 116, 118 or requests to modify data stored in the databases 116, 118. In response to requests for data, the server 114 may generally provide the data, indicate that no matching data was found, or indicate that the source of data was unavailable. In response to requests to modify data stored in the databases 116, 118, the server 114 may generally indicate that the data was successfully modified or that the data was not successfully modified.

The server 114 may enter three different states for managing migration of data. FIG. 1A illustrates an example of the system 100 where the server 114 is in a first state, FIG. 1B illustrates an example of the system 100 where the server 114 is in a second state, and FIG. 1C illustrates an example of the system 100 where the server 114 is in a third state. These states are discussed in more detail below.

For a process to migrate data stored in the first database 116 with an initial format to the second database 118 with a subsequent format, the server 114 may receive a request to begin migrating that data and in response, access data from the first database and store the data in the second database. In some implementations, the server 114 may enable users to specify migration rules for storing the data in the second database from the first database. For example, the migration rules may specify which fields of the first database match to which fields of the second database.

After all the data is stored in the second database with the subsequent format, the system may be in a first state. FIG. 1A illustrates an example of the system 100 where the server 114 is in the first state. In the first state, requests from the client devices and code running on the client devices may be unchanged from before the migration process began resulting in no downtime. In the first state, the server 114 may expose data in the first database 116 to client devices, not expose data in the second database 118 to client devices, and replicate updates on the first database 116 to the second database 118.

For example, in the first state, the server 114 may receive a request from the first client device 110 to change a patient's name in the first database 116 from "JOHN DOE" to "JOHN Q. DOE," e.g., "UPDATE FIRST_DATABASE SET NAME='JOHN Q. DOE' WHERE NAME='JOHN DOE'," determine that the server 114 is in the first state so that data from the first database 116 is exposed, determine that data in the first database 116 is being updated, in response, replicate the update to the second database 118, and provide a response to the first client device 110 that the update is successful. In another example, in the first state, the server 114 may receive a request from the second client device 112 to change a patient's name in the second database 118 from "JOHN DOE" to "JOHN Q. DOE," e.g., "UPDATE SECOND_DATABASE SET NAME='JOHN Q. DOE' WHERE NAME='JOHN DOE'," determine that the server 114 is in the first state so that data from the second database 116 is not exposed, and in response, provide an indication that the update is not successful because the second database 118 is not exposed, e.g., an indication "SECOND_DATABASE NOT FOUND." In yet another example, in the first state, the server 114 may receive a request from the first client device 110 to return a primary care giver associated with a patient's name in the first database 116, determine that the server 114 is in the first state so that data from the first database 116 is exposed, determine that data in the first database 116 is not being updated, in response, determine no replication is needed to the second database 118, and provide a response to the first client device 110 that the update is successful.

The additional interception and replication of updates in the first state may result in a performance penalty. However, the first state may enable the second database 118 to be maintained so that code using the second database 118 may be quickly deployed without waiting for the second database 118 to be generated from the first database 116. In the first state, the server 114 may receive a request to end a migration process and in response, delete the second database 118 and end replicating updates from the first database 116 to the second database 118.

When some code on the client devices is ready to be updated so that server 114 should respond to both updated code on the client devices that request data from the second database, e.g., the second client device 112, and non-updated code on the client devices, e.g., the first client device 110, that request data from the first database, the system 100 may receive a request to place the server 114 in a second state and in response place the server 114 in the second state. FIG. 1B illustrates an example of the system 100 where the server 114 is in the second state. In the second state, the server 114 may respond to requests from both original code that uses the first database 116 and updated code that uses the second database 118. In the second state, the server 114 may expose data from both databases and replicate updates on either database to the other database.

For example, in the second state, the server 114 may receive a request from the first client device 110 to change a patient's name in the first database 116 from "JOHN DOE" to "JOHN Q. DOE," e.g., "UPDATE FIRST_DATABASE SET NAME='JOHN Q. DOE' WHERE NAME='JOHN DOE'," determine that the server 114 is in the second state so that data from the first database 116 is exposed, determine that data in the first database 116 is being updated, replicate the update to the second database 118, and provide a response to the first client device 110 that the update is successful. In another example, in the second state, the server 114 may receive a request from the second client device 112 to change a patient's name in the second database 118 from "JOHN DOE" to "JOHN Q. DOE," e.g., "UPDATE SECOND_DATABASE SET NAME='JOHN Q. DOE' WHERE NAME='JOHN DOE'," determine that the server 114 is in the second state so that data from the second database 118 is exposed, determine that data in the second database 118 is being updated, replicate the update to the first database 116, and provide a response to the second client device 112 that the update is successful.

The additional interception and replication of updates in the second state may result in a performance penalty. However, the second state may enable the server 114 to respond to client devices that include updated code and respond to client devices that include non-updated code, enabling the system 100 to support partial updates of code. In the second state, the server 114 may not enable the migration process to be ended and may require that the server 114 be placed into the first state or third state before the migration process is ended.

When all the code on the client devices have been updated so that all the client devices request data from the second database 118 and do not request data from the first database 116, the server 114 may receive a request to place the server 114 in a third state. FIG. 1C illustrates an example of the system 100 where the server 114 is in the third state. In the third state, the server 114 may respond to requests from both original code that uses the first database 116 and updated code that uses the second database 118. In the third state, the server 114 may expose data from the second database 118, not expose data from the first database 116, and replicate updates on the second database 118 to the first database 116.

For example, in the third state, the server 114 may receive a request from the first client device 110 to correct a record stored in the first database 116 to change a patient's name from "JOHN DOE" to "JOHN Q. DOE," e.g., "UPDATE FIRST_DATABASE SET NAME='JOHN Q. DOE' WHERE NAME='JOHN DOE'," determine that the server 114 is in the third state so that data from the first database 116 is not exposed, and in response to determining that the requested source of the data is not exposed, provide an indication that the update is not successful because the first database 116 is not exposed, e.g., an indication "FIRST_DATABASE NOT FOUND." In another example, in the third state, the server 114 may receive a request from the second client device 112 to correct a record stored in the second database 118 to change a patient's name from "JOHN DOE" to "JOHN Q. DOE," e.g., "UPDATE SECOND_DATABASE SET NAME='JOHN Q. DOE' WHERE NAME='JOHN DOE'," determine that the server 114 is in the third state so that data from the second database 118 is exposed, determine that data in the second database 118 is being updated, replicate the update to the first database 116, and provide a response to the second client device 112 that the update is successful.

The additional interception and replication of updates of the third state may result in a performance penalty. However, in the third state, the migration may still be easily reverted as the first database 116 is still available. For example, the server 114 may receive a request to place the server 114 in the second state and code on the client devices may be reverted to the original code that requests data from the first database 116, then receive a request to place the server 114 in the first state after all the client devices are reverted to the original code, and then receive a request to end the migration and, in response, delete the second database 118. In the third state, the server 114 may also instead receive a request to end the migration and, in response, delete the first database 116 and no longer replicate updates on the second database 118 to the first database 116. Accordingly, the different states may allow the system 100 to gradually enable the use of databases with different data structure formats and code to access the databases to be gradually updated without downtime.

As discussed above, client devices 110, 112 may be separate devices. However, in some implementations the system 100 may interchange the client devices 110, 112 with code that requests data from the first database 116 and code that requests data from the second database 118, respectively, that is on a single client device. For example, the client devices 110, 112 may instead be different applications running on one or more devices. In some implementations, replication of updates from one database to another database in response to requests to the server 114 may be performed to both databases in a same transaction. For example, the server 114 may determine a request is to change a patient record in the first database 116, queue a change to the patient record in the first database 116, queue a change to the patient replicate to the second database 118, and execute both queued changes simultaneously.

Figure 2:
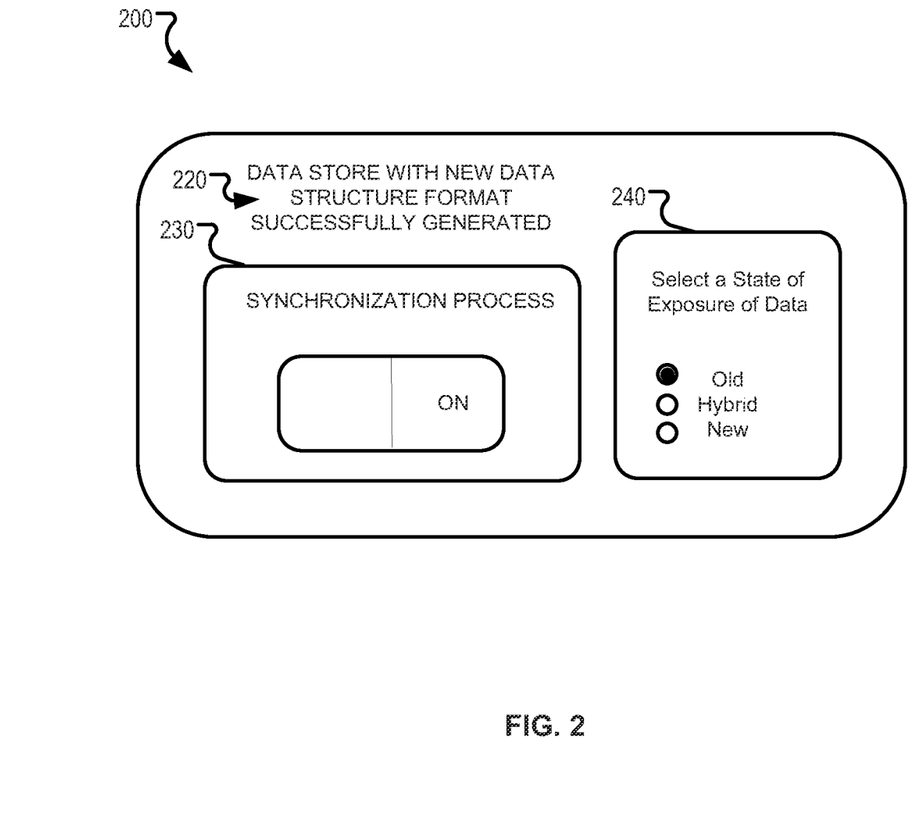
FIG. 2 is an example of a graphical user interface for managing states of a server.

FIG. 2 is an example of a graphical user interface (GUI) 200 for managing states of a server. The following will describe the server for which the GUI 200 manages states as the server 114 shown in FIGS. 1A-1C. However, the states of other servers may be managed using the GUI 200. The GUI 200 may be provided by the server 144 through a web interface to a client device used by a user. In some implementations, the client device showing the GUI 200 may the client devices 110, 112 or other computing devices. In other implementations, the GUI 200 may be rendered by software installed on a client device that is in communication with the server.

The GUI 200 may include an indicator 220 of a status of a process of generating a new data store, a migration control 230 for requesting that a migration process begin or terminate, and a state control 240 for controlling a state of the server 114. The indicator 220 may be dynamic text or graphics that indicates a status of generation of the new data store. For example, the indication 220 may state "1234 of 10,000 records stored, estimated time of one hour remaining to complete generating new data store," "Data store with new data structure format successfully generated," or "Data generation failed, please check migration rules." The migration control 230 may be a toggle that toggles between an "OFF" position and an "ON" position. Toggling the migration control 230 from the "OFF" to the "ON" position may cause the client device to provide a request to the server 114 to begin a migration process and toggling the migration control 230 from the "ON" to the "OFF" position may cause the client device to provide a request to the server 114 to end a migration process. The state control 240 may be a set of radio buttons that enable a selection of three buttons that respectively represent a first state, a second state, and a third state. For example, a first button associated with the first state may be labeled "OLD," a second button associated with the second state may be labeled "HYBRID," and a third button associated with a third state maybe labeled "NEW."

Selecting a button may cause a client device to provide a request to the server 114 to enter the state corresponding to the selected button. While the migration control 230 is describes as a toggle and the state control 240 is described as radio buttons, other types of controls may be used, e.g., drop downs, sliders, etc.

Before beginning a migration process, the migration control 230 may initially be set to an "OFF" position and the indicator 220 may be blank. Once a user specifies a first database in a first format to migrate to a second database in a second format and any applicable migration rules, and is ready to begin the migration process, the user may toggle the migration control 230 to the "ON" position. In response to the toggle, the client device may provide the server 114 a request to migrate data from the first database to the second database.

In response to the request, the server 114 may begin accessing data from the first database, storing the data in the second database according to any specified migration rules or default migration rules, and updating the indicator 220 to indicate a status of generating the second database. During this time, the state control 240 may be disabled. For example, the state control 240 may be grayed out and not responsive to user input.

Once the server 114 determines that the data from the first database has been successfully stored in the second database, the server 114 may update the indicator 220 and enable the user to request a state of the server 114 be changed. For example, once the server 114 determines that all records from the first database have been stored in the second database, the server 114 may be in the first state, provide the client device information that causes the client device to show that the button for the first state in the state control 240 is selected and enable the buttons of the state control 240 to be selected.

When a user wishes for the server 114 to enter the second state, e.g., when some of the client devices will be updated to use code that accesses the second database, the user may select the button of the state control 240 associated with the second state and the client device may provide a request to the server 114 to enter the second state. In the second state, the migration process may not be ended. The server 114 may need to enter the first state or third state before ending a migration process. Accordingly, once the button corresponding to the second state is selected, the client device may disable the migration control 230 so that client device may not provide a request to the server 114 to end the migration process. When a user wishes for the server 114 to enter the third state, e.g., when the client devices are updated to no longer use code from the first database, the user may select the button of the state control 240 associated with the third state and the client device may provide a request to the server 114 to enter the third state. Once the user is ready to complete the migration process, the user may toggle the migration control 230 to the "OFF" position and the client device may provide a request to the server 114 to end the migration process.

Figure 3:
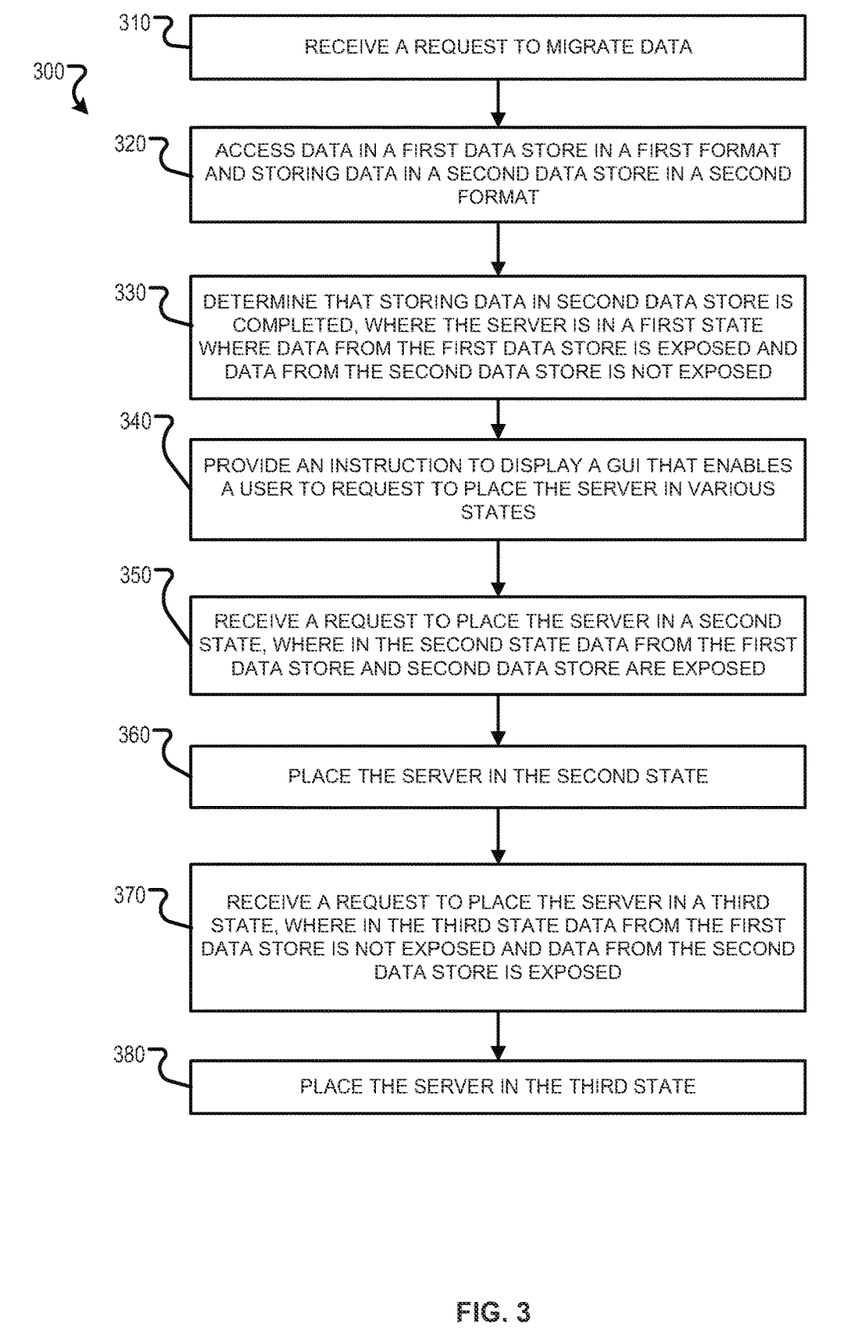
FIG. 3 is an example of a flow chart for managing migration of data.

FIG. 3 is an example of a flow chart 300 for managing migration of data. Initially, a request to migrate data from a first data store in a first structure format to a different, second data store in a different, second data structure format may be received (310). For example, the server 114 may receive a request from a client device to migrate data from a first database that stores each patient record in association with a single primary care provider to a second database that stores each patient record in association with up to five primary care providers. The request may be sent from the client device in response to the server 114 providing the client device a web interface including the GUI 200 and the user selecting to toggle a migration control 230 to an "ON" position.

Data in the first data store may be accessed and stored in the second data store in response to receiving the request (320). For example, in response to receiving the request, the server 114 may access each of the records in the first database, access and apply migration rules specified by the user for migrating the data or default rules for migrating data, and store the data in the second database.

A determination may be made that storing data in the second data store from the data in the first data store has been completed (330). For example, the server 114 may determine that the server 114 has accessed each of the records in the first data store, applied the migration rules to the accessed records, and stored a corresponding record corresponding to each of the records in the first data store according to the migration rules. When the server 114 has completed storing the data in the second data store, the server 114 may be in a first state where the server 114 (i) exposes data from the first data store to the client device, (ii) does not expose data from the second data store to the client device, and (iii) replicates changes in the first data store to the second data store. For example, when the server 114 determines that storing data in the second database 118 is completed, the server 114 may be in the first state where in response to requests to change data in the first database 116, the server 114 may determine that the server is in a first state so that data from the first database 116 is exposed, in response, permit the data to be changed, and replicate the change to the second database 118. In another example, in the first state in response to requests to change data in the second database 118, the server 114 may determine that the server is in a first state so that data from the second database 118 is not exposed, and in response, provide an indication that a database with the name of the second database 118 could not be found.

Instructions to provide a graphical user interface that enables a user to request to place the server in the first state, a second state, or a third state may be provided by the server to the client device in response to determining, by the server, that the server has completed storing the data in the second data store from the data in the first data store (340). For example, in response to determining that storing data from the first database 116 in the second database 118 is completed, the server 114 may update the GUI 200 so that or provide the GUI 200 where the indicator 220 states "Data store with new data structure format successfully generated," update the state control 240 to indicate that the button corresponding to the first state is selected, and enable the buttons of the state control 240 to be selected.

A request to place the server in the second state may be received (350). For example, when some of the code for accessing data in the second database 118 is ready to be used, an administrator may select the button associated with the second state of the state control 240 causing the client device to provide a request to the server 114 to place the server in the second state. In the second state, the server may expose data from the first data store to the client device, (ii) expose data from the second data store to the client device, and (iii) replicate changes in either the first data store or second data store to the other data store. For example, in the second state the server 114 may, in response to requests to change data in the first database 116, determine that the server is in a second state so that data from the first database 116 is exposed, in response, permit the data to be changed, and replicate the change to the second database 118. In another example, in the second state, in response to requests to change data in the second database 118, the server 114 may determine that the server is in a second state so that data from the second database 118 is exposed, in response permit the data to be changed, and replicate the change to the first database 116.

The server may be placed in the second state in response to receiving the request to place the server in the second state (360). For example, in response to receiving the request, to place the server 114 in the second state, generated by a client device in response to a selection of a user of a button associated with the second state in the state control 240, the server 114 may enter the second state.

A request to place the server in the third state may be received (370). For example, when all the code for accessing the data is updated to access data from the second database 118, a user may select the button associated with the third state and in response the client device may provide a request to the server to enter the third state. In the third state, the server (i) does not expose data from the first data store to the client device, (ii) exposes data from the second data store to the client device, and (iii) replicates changes in the second data store to the first data store. For example, in the third state, in response to requests to change data in the second database 118, the server 114 may determine that the server is in a third state so that data from the second database 118 is exposed, in response permit the data to be changed, and replicate the change to the first database 116. In another example, in the third state, in response to requests to change data in the first database 116, the server 114 may determine that the server is in a third state so that data from the first database 116 is not exposed, and in response, provide an indication that a database with the name of the first database 116 could not be found.

The server may place the server in the third state in response to receiving the request to place the server in the third state (380). For example, in response to receiving the request to place the server 114 in the third state generated by a client device in response to a selection of a user of a button associated with the third state in the state control 240, the server 114 may enter the third state.

In the third state, the server may receive a request to end the migration process. For example, when the user is satisfied with the migration and ready to make the migration process irreversible, the user may toggle the migration control 230 from an "ON" position to the "OFF" position, which may cause the client device to provide a request to the server 114 to end the migration process. In response to receiving the request to end the migration process, the server 114 may determine that the server 114 is in the third state, and in response, delete the first database 116. In another example, when the server 114 is in a first state and receives a request to end the migration process, the server 114 may determine that the server 114 is in the first state, and in response, delete the second database 118. In yet another example, when the server 114 is in a second state and receives a request to end the migration process, the server 114 may determine that the server 114 is in the second state so the migration process cannot be ended, and in response, provide the client device an indication that the migration process cannot be ended from the second state and can only be ended from the first or third state.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

The invention claimed is:

1. A computer-implemented method comprising:
receiving, by a server and from a client device, a request to migrate data from a first data store in a first structure format to a different, second data store in a different, second data structure format;
accessing, by the server, the data in the first data store based on the received request to migrate the data;
storing, by the server, the data accessed in the first data store in the second data store;
determining, by the server, that the server has completed storing the data in the second data store, wherein when the server has completed storing the data in the second data store the server is in a first state where the server (i) exposes data from the first data store to the client device, (ii) does not expose data from the second data store to the client device, and (iii) replicates changes in the first data store to the second data store;
receiving, by the server and from a user, a request to place the server in the second state, wherein while in the second state the server (i) exposes data from the first data store to the client device, (ii) exposes data from the second data store to the client device, (iii) replicates changes in the first data store to the second data store, and (iv) replicates changes in the second data store to the first data store;
in response to receiving, by the server, the request to place the server in the second state, placing, by the server, the server in the second state;
replicating, by the server while in the second state, changes in the first data store to the second data store;
replicating, by the server while in the second state, changes in the second data store to the first data store;
obtaining, by the server while in the second state, data for responding to a user request, wherein the data for responding to the user request is obtained from the first data store or the second data store without downtime that interrupts a service function of the server that is used for responding to user requests, based on the server replicating changes: (i) in the first data store to the second data store, and (ii) in the second data store to the first data store;
providing, by the server, the data obtained from the first data store or the second data store as a response to the user request;
receiving, by the server, a request to place the server in a third state, wherein while in the third state the server (i) does not expose data from the first data store to the client device, (ii) exposes data from the second data store to the client device, and (iii) replicates changes in the second data store to the first data store; and
placing the server in the third state.

2. The method of claim 1, further comprising:
receiving a request for data from the second data store;
determining that the server is in the first state; and
in response to determining that the server is in the first state, providing an indication that data from the second data store is not available.

3. The method of claim 2, wherein placing the server in the third state comprises deleting the first data store.

4. The method of claim 1, further comprising:
receiving a request for data from the first data store;
determining that the server is in the third state; and
in response to determining that the server is in the third state, providing an indication that data from the first data store is not available.

5. The method of claim 1, wherein in the second state, the server intercepts requests to change data stored in the first data store and generates a corresponding request to change data stored in the second data store.

6. The method of claim 1, wherein in the second state the server intercepts requests to change data stored in the second data store and generates a corresponding request to change data stored in the first data store.

7. The method of claim 1, wherein the first structure format includes fields with single values and the second structure format includes corresponding fields with multiple values.

8. The method of claim 7, wherein storing the data in the second data store comprises storing the data according to one or more migration rules that specify the fields in the first structure format that correspond to the fields in the second structure format.

9. A system comprising:
one or more computers; and
one or more storage devices storing instructions that, when executed by the one or more computers, cause the one or more computers to perform operations comprising:
receiving, by a server and from a client device, a request to migrate data from a first data store in a first structure format to a different, second data store in a different, second structure format;
accessing, by the server, the data in the first data store based on the received request to migrate the data;
storing, by the server, the data accessed in the first data store in the second data store;
determining, by the server, that the server has completed storing the data in the second data store, wherein when the server has completed storing the data in the second data store the server is in a first state where the server (i) exposes data from the first data store to the client device, (ii) does not expose data from the second data store to the client device, and (iii) replicates changes in the first data store to the second data store;
receiving, by the server and from a user, a request to place the server in the second state, wherein while in the second state the server (i) exposes data from the first data store to the client device, (ii) exposes data from the second data store to the client device, (iii) replicates changes in the first data store to the second data store, and (iv) replicates changes in the second data store to the first data store;
in response to receiving, by the server, the request to place the server in the second state, placing, by the server, the server in the second state;
replicating, by the server while in the second state, changes in the first data store to the second data store;
replicating, by the server while in the second state, changes in the second data store to the first data store;
obtaining, by the server while in the second state, data for responding to a user request, wherein the data for responding to the user request is obtained from the first data store or the second data store without downtime that interrupts a service function of the server that is used for responding to user requests, based on the server replicating changes: (i) in the first data store to the second data store, and (ii) in the second data store to the first data store;
providing, by the server, the data obtained from the first data store or the second data store as a response to the user request;

receiving, by the server, a request to place the server in a third state, wherein while in the third state the server (i) does not expose data from the first data store to the client device, (ii) exposes data from the second data store to the client device, and (iii) replicates changes in the second data store to the first data store; and placing, by the server, the server in the third state.

10. The system of claim 9, the operations further comprising:

receiving a request for data from the second data store;
determining that the server is in the first state; and
in response to determining that the server is in the first state, providing an indication that data from the second data store is not available.

11. The system of claim 10, wherein placing the server in the third state comprises deleting the first data store.

12. The system of claim 9, the operations further comprising:

receiving a request for data from the first data store;
determining that the server is in the third state; and
in response to determining that the server is in the third state, providing an indication that data from the first data store is not available.

13. The system of claim 9, wherein in the second state, the server intercepts requests to change data stored in the first data store and generates a corresponding request to change data stored in the second data store.

14. The system of claim 9, wherein in the second state the server intercepts requests to change data stored in the second data store and generates a corresponding request to change data stored in the first data store.

15. The system of claim 9, wherein the first structure format includes fields with single values and the second structure format includes corresponding fields with multiple values.

16. The system of claim 15, wherein storing the data in the second data store comprises storing the data according to one or more migration rules that specify the fields in the first structure format that correspond to the fields in the second structure format.

17. A non-transitory computer-readable medium storing software comprising instructions executable by one or more computers which, upon such execution, cause the one or more computers to perform operations comprising:

receiving, by a server and from a client device, a request to migrate data from a first data store in a first structure format to a different, second data store in a different, second structure format;
accessing, by the server, the data in the first data store based on the received request to migrate the data;
storing, by the server, the data accessed in the first data store in the second data store;
determining, by the server, that the server has completed storing the data in the second data store, wherein when the server has completed storing the data in the second data store the server is in a first state where the server (i) exposes data from the first data store to the client device, (ii) does not expose data from the second data store to the client device, and (iii) replicates changes in the first data store to the second data store;
receiving, by the server and from a user, a request to place the server in the second state, wherein while in the second state the server (i) exposes data from the first data store to the client device, (ii) exposes data from the second data store to the client device, (iii) replicates changes in the first data store to the second data store, and (iv) replicates changes in the second data store to the first data store;
in response to receiving, by the server, the request to place the server in the second state, placing, by the server, the server in the second state;
replicating, by the server while in the second state, changes in the first data store to the second data store;
replicating, by the server while in the second state, changes in the second data store to the first data store;
obtaining, by the server while in the second state, data for responding to a user request, wherein the data for responding to the user request is obtained from the first data store or the second data store without downtime that interrupts a service function of the server that is used for responding to user requests, based on the server replicating changes: (i) in the first data store to the second data store, and (ii) in the second data store to the first data store; and
providing, by the server, the data obtained from the first data store or the second data store as a response to the user request;
receiving, by the server, a request to place the server in a third state, wherein while in the third state the server (i) does not expose data from the first data store to the client device, (ii) exposes data from the second data store to the client device, and (iii) replicates changes in the second data store to the first data store; and
placing, by the server, the server in the third state.

18. The medium of claim 17, the operations further comprising:

receiving a request for data from the second data store;
determining that the server is in the first state; and
in response to determining that the server is in the first state, providing an indication that data from the second data store is not available.

19. The medium of claim 17 the operations further comprising:

receiving a request for data from the first data store;
determining that the server is in the third state; and
in response to determining that the server is in the third state, providing an indication that data from the first data store is not available.

20. The medium of claim 17, wherein in the second state, the server intercepts requests to change data stored in the first data store and generates a corresponding request to change data stored in the second data store.

* * * * *

UNITED STATES PATENT AND TRADEMARK OFFICE
CERTIFICATE OF CORRECTION

PATENT NO. : 10,282,433 B1  
APPLICATION NO. : 14/943702  
DATED : May 7, 2019  
INVENTOR(S) : Brian Caruso Page 1 of 1

It is certified that error appears in the above-identified patent and that said Letters Patent is hereby corrected as shown below:

In the Claims

Column 13, Line 6, Claim 1, after "second" delete "data".

Column 16, Line 46, Claim 19, delete "17" and insert -- 17, --.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*